US010048731B2

(12) United States Patent
Srivastava

(10) Patent No.: US 10,048,731 B2
(45) Date of Patent: Aug. 14, 2018

(54) MITIGATION OF CHARGING INDUCED VOLTAGE OFFSET

(71) Applicant: Intel Corporation, Santa Clara, CA (US)

(72) Inventor: Amit Kumar Srivastava, Penang (MY)

(73) Assignee: Intel Corporation, Santa Clara, CA (US)

( * ) Notice: Subject to any disclaimer, the term of this patent is extended or adjusted under 35 U.S.C. 154(b) by 203 days.

(21) Appl. No.: 14/752,225

(22) Filed: Jun. 26, 2015

(65) Prior Publication Data

US 2016/0378154 A1    Dec. 29, 2016

(51) Int. Cl.
| G06F 1/00 | (2006.01) |
| G06F 1/26 | (2006.01) |
| G06F 13/42 | (2006.01) |
| H02J 7/04 | (2006.01) |
| H02J 7/00 | (2006.01) |

(52) U.S. Cl.
CPC .............. *G06F 1/266* (2013.01); *G06F 13/42* (2013.01); *H02J 7/045* (2013.01); *H02J 2007/0062* (2013.01); *H02J 2007/0096* (2013.01)

(58) Field of Classification Search
CPC ........ G06F 1/266; G06F 13/42; H02J 7/0047; H02J 7/045
See application file for complete search history.

(56) References Cited

U.S. PATENT DOCUMENTS

| 5,663,689 A * | 9/1997 | Baumgartner ........ H03L 7/0896 327/157 |
| 6,178,514 B1 * | 1/2001 | Wood ...................... G06F 1/266 713/300 |
| 2005/0104623 A1 * | 5/2005 | Guo ........................... H04L 1/22 326/82 |
| 2009/0295339 A1 | 12/2009 | Wong |
| 2010/0064148 A1 | 3/2010 | Ho et al. |
| 2013/0191566 A1 * | 7/2013 | Kaestner ............... G06F 13/426 710/104 |
| 2013/0275779 A1 | 10/2013 | He |

FOREIGN PATENT DOCUMENTS

| JP | 2006048594 A | 2/2006 |
| KR | 1020140093058 A | 7/2014 |

OTHER PUBLICATIONS

PCT International Search Report and Written Opinion, PCT Application No. PCT/US2016/029141, dated Aug. 8, 2016, 15 pages.

* cited by examiner

*Primary Examiner* — Jaweed A Abbaszadeh
*Assistant Examiner* — Gayathri Sampath
(74) *Attorney, Agent, or Firm* — International IP Law Group, P.L.L.C.

(57) ABSTRACT

Techniques for mitigating voltage offsets are described herein. A method for mitigating voltage offset includes receiving, via a sensor, charging current information. The method also includes adjusting, via a common mode adjustment circuitry, a common mode voltage based on charging current information and a physical layer circuit mode.

25 Claims, 6 Drawing Sheets

100

MITIGATION OF CHARGING INDUCED VOLTAGE OFFSET

TECHNICAL FIELD

This disclosure relates generally to techniques for charging devices. Specifically, this disclosure relates to techniques for mitigating induced ground offset in charging devices.

BACKGROUND ART

Computing systems may include integrated circuits, systems on a chip (SOCs), and other circuit components as well as peripheral devices configured to communicate over a computer bus. In some cases, a given receiver may be communicatively coupled to a given endpoint over the computer bus, and may be associated with a standard of bus communications. In some cases, a computer bus such as the Universal Serial Bus (USB) may allow devices to charge via a USB cable.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
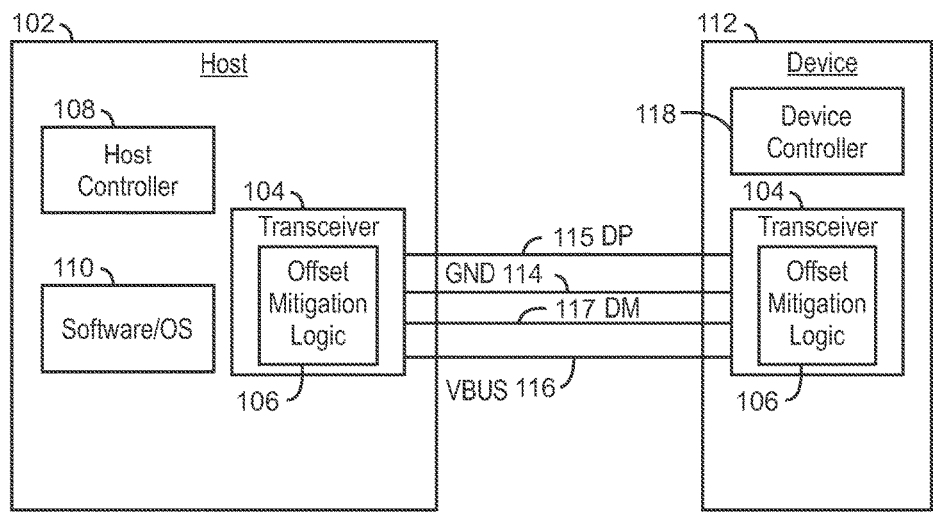
FIG. 1 illustrates an example computing system having logic configured to mitigate voltage offsets.

The present disclosure relates generally to techniques for mitigating ground offset due to charging over a computer bus. As discussed above, a computer bus may enable coupled devices to be charged via a power supply and a common ground. A common mode voltage may be desired to be within a predefined range. For example, a computer bus may be associated with a given computer bus standard requiring a common mode voltage between two connected computing devices to be within a predefined range. The techniques described herein include mitigating voltage offsets.

More specifically, the techniques described herein include detecting a charging current and adjusting a common mode voltage for a transceiver based on the charging current information and whether the transceiver is configured in a device mode or as a host mode. For example, in a given computer bus, a computing device having a transceiver may be configured to be a dual role device. As a dual role device, a transceiver may be configured to be either a host or a device depending on a handshake between the transceiver and a connected transceiver of a second computing device. In this case, a voltage offset at a receiver may be different based on whether a given transceiver is configured in a host mode or in a device mode.

An example of a computer bus may include a Universal Serial Bus (USB) indicated in a specification standard entitled, "The USB 3.1 Specification released on Jul. 26, 2013 and ECNs approved through Aug. 11, 2014," referred to herein as the "USB specification." In some cases, a port may be an all-in-one port. An all-in-one port may provide a power interface, may be at least partially or fully reversible, and may include general data interfaces as well as additional data-specific interfaces such as a display interface, an audio interface, and the like. An example of an all-in-one port may include a Universal Serial Bus (USB) "Type C" connector, indicated in a specification standard entitled, "USB Type-C Cable and Connector Specification Revision 1.0, Aug. 11, 2014," referred to herein as the "USB Type-C specification."

In USB battery charging detection using a Type-C connector, some devices may be charged through a power bus ($V_{BUS}$) line. However, charging over a $V_{BUS}$ line may result in a ground offset voltage due to a finite ground impedance that is more than allowed in the USB specification. For example, devices charging at 1.5 amps (A) or 3 A may see a 375 millivolts (mV) or 750 mV ground offset, as compared to a recommended 500 milliamps (mA) or 900 mA induced ground offset of 175 mV or 225 mV as defined in prior versions of the USB specification. Due to this higher ground offset voltage, a common mode voltage difference may be seen by receiving devices, whether configured in a host or device mode, that may exceed the recommended voltage difference as defined in the USB protocol.

Since a host computing device (also referred to herein as a host) and a peripheral computing device (also referred to herein as a device) can share a common ground, charging currents may result in a ground offset between a host and ground, which results in a common mode voltage difference seen between signaling transfers between the host and device. For example, the USB specification defines a common mode voltage for receiver to be in the range of −50 mV to 500 mV or an allowed maximum ground offset of 25 mV per 100 mA current. However, with a higher charging current such as 1.5 A, the ground offset could result in a 375 mV ground offset or ~500 mV as seen on some proprietary chargers. Furthermore, the ground offset can depend on cable length and the type of cable used between the host and device. For example, longer cables and lower quality cables may result in a larger ground offset even if a charging current is below 900 mA. Such a higher ground offset may induce a common mode voltage beyond the allowed value defined in a computer bus specification, such as the USB specification, and can result in malfunctioning of a receiver. For example, data being sent on data transmission lines sharing a common ground with the charging line may be corrupted. Electrical overshoot stress (EOS) can also cause a breakdown of devices due to voltages higher than the devices were designed to operate with. Moreover, this ground offset is present in both current mode and voltage mode topologies.

As discussed above, techniques for mitigating voltage offsets are provided herein. Charging current information such as a charging current indication requested by a device and a charging current amount provided by a host can be detected by a current sensor. In some examples, power management integrated circuit (PMIC)-based $V_{BUS}$ current sensing can be implemented during a host or device mode. In some examples, the PMIC can send charging current information to a physical layer such as a USB physical layer through an interconnect such as an Inter-Integrated Circuit (I2C) serial bus. A common mode adjustment circuitry of a transceiver can adjust a common mode voltage by utilizing an indication of charging current and amount of charging current while acting as a host and/or a device.

The techniques described herein thus mitigate ground offset induced common mode voltage fluctuations. The techniques enable increased current charging without imposing costs associated with higher quality cables. Furthermore, the techniques enable longer cables to be used without device malfunctions. The techniques also provide better device performance by using a known property of charging from power management integrated circuits (PMICs) during host mode and PMIC-based sensing during device mode. Moreover, the techniques use existing platform components without adding any additional components to the existing platforms. Additionally, the techniques enable uninterrupted use of a computer bus without cutting off communication as a precautionary measure due to voltages outside of allowed ranges. As the techniques described herein can be implemented using a logic with a low gate count and few analog components, the techniques also provide a space saving solution. Finally, the techniques can reduce bill of materials (BOM) costs.

Furthermore, using these techniques, charging information can be communicated to software using hardware detection and flow. This software-based communication gives an opportunity to interact with a user through software. For example, an indication of charging current can be displayed to a user via a graphical user interface. In this case, if the techniques detect that the ground offset through a cable is determined to be above predetermined limits, then there can be an opportunity for the software to adjust the I/O circuits for more robust operation. An operating system (OS) or basic input/output system (BIOS) can also notify the user that a cable appears to be out of spec and should be replaced.

FIG. 1 illustrates an example computing system having logic configured to mitigate voltage offsets. The computing system 100 may include a host 102 including a transceiver 104 having offset mitigation logic 106, a host controller 108, and a software/operating system (OS) 110. The host 102 may be communicatively coupled to a device 112 via a computer bus ground (GND) 114, a positive signal data line 115, power line ($V_{BUS}$) 116, and a negative signal data line 117 connected between two transceivers 104. The device 112 may also include a transceiver 104 having an offset mitigation logic 106 and a device controller 118.

In some cases, components such as the offset mitigation logic 106 may be implemented as logic, at least partially comprising hardware logic. For example, the offset mitigation logic 106 may be electronic circuitry logic, firmware of a microcontroller, and the like. In some cases, the offset mitigation logic 106 may be implemented as instructions executable by a processing device, as a driver, electronic circuitry, and the like, or any combination thereof. In any case, the transceiver 104 can be configured to send and receive data and power over a voltage line $V_{BUS}$ 116 to and/or from a device 112. For example, the device 112 can be a power supply such as a battery. In some cases, the ground 114 and voltage line $V_{BUS}$ 116 may be part of a Universal Serial Bus (USB).

In some examples, the computer bus can be an all-in-one port including a power interface, which may be at least partially or fully reversible, and may include general data interfaces as well as additional data-specific interfaces such as a display interface, an audio interface, and the like. For example, an all-in-one port may include a USB "Type C" connector. Other all-in-one ports may be implemented in the offset mitigation techniques described herein. However, for simplicity, the all-in-one port may be interchangeably referred to herein as or as simply an all-in-one port in general or as an USB Type-C connector. All-in-one ports, such as the USB Type-C connector, may be adopted in multiple compute and connect platforms. In some examples, the all-in-one port may be associated with a voltage offset. For example, the voltage offset can be caused by a charging current greater than the USB specification or USB cable length and/or cable quality.

In some cases, the offset mitigation logic 106 may be configured to determine whether the transceiver 104 is operating in a host mode or a device mode. For example, if the transceiver 104 of host 102 is operating in host mode, the transceiver 104 of device 112 may be operating in a device mode.

In some examples, the offset mitigation logic 106 may be configured to detect a charging current or voltage offset indication. In some cases, the logic 106 can be further configured to compensate for the voltage offset based on at least the charging current and the topology of the transceiver. For example, the topology can be a current mode topology or a voltage mode topology. In addition, in some examples, the software/OS 110 can display the charging current or voltage offset indication. For example, the charging current voltage offset indication can be displayed to a user via a suitable graphical user interface (GUI).

The diagram of FIG. 1 is not intended to indicate that the example system 100 is to include all of the components shown in FIG. 1. Rather, the example system 100 can include fewer or additional components not illustrated in FIG. 1 (e.g., additional devices, receivers, logic, etc.).

Figure 2:
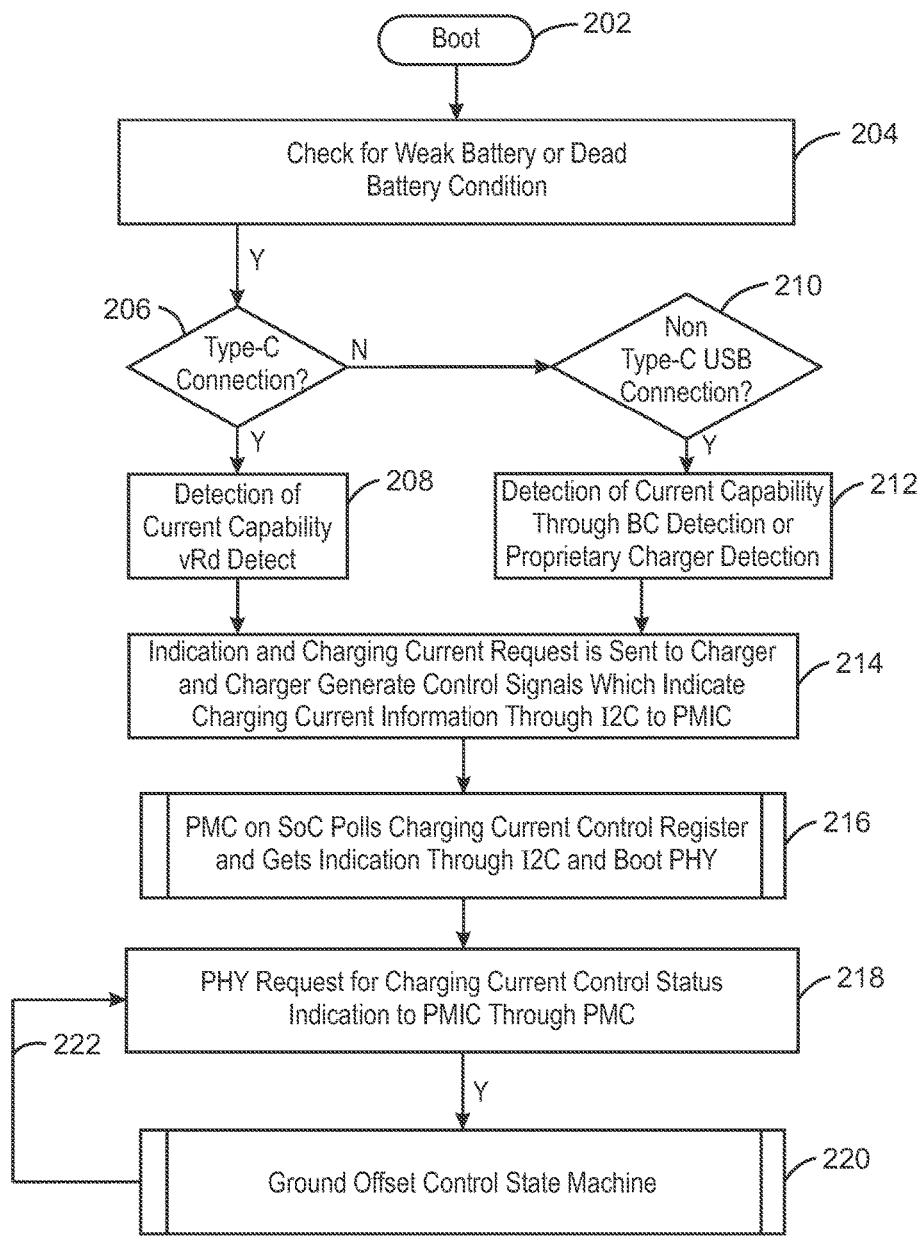
FIG. 2 is a high level flow diagram of an example method for detecting voltage offsets.

FIG. 2 is a high level flow diagram of an example method for detecting voltage offsets. The example method of FIG. 2 is generally referred to using the reference number 200 and can be implemented using the offset mitigation logic 106 of FIG. 1.

At block 202, components of a system, such as the mitigation logic 106 system 100 of FIG. 1, can boot. For example, the boot can start from a G3 (mechanical off) or S5 (soft off) Advanced Configuration and Power Interface (ACPI) state.

At block 204, a weak or dead battery condition is checked. If the the battery is weak, then a check may be performed to determine if a source is available to charge the battery to a higher level. In some examples, the the check for a weak battery condition or dead battery condition can be performed before a cold boot.

At block 206, a determination is made as to whether a Type-C connection is being used. For example, if a USB Power Delivery (USBPD) type cable is used, then Power Delivery (PD)-based current detection can be used to determine whether a Type-C cable is plugged in.

At block 208, if a Type-C connection is detected, then a detection of current capability may be performed. For example, USB Type-C based vRd detection can be used to detect current capability. VRd refers to a voltage on a configuration channel that can be monitored to determine available current on a power line 116.

At block 210, connected determination is made as to whether a non-Type-C USB connection is being used. For example, USB non-Type-C cable or proprietary cable is connected. A non-Type-C USB connection can be detected by detecting an absence of communication over the configuration channel (CC) line. For example, a check for a type-C Pin can be performed and $V_{BUS}$ and ID detection can be used.

At block 212, if a non-Type-C USB or proprietary connection is detected, then detection of current capability can be performed either as per defined in a battery charging (BC) detection specification or through a proprietary charger detection. For example, with a non-type-C USB cable connected, detection of current capability can be performed via a proprietary current sensor.

In some cases, the system 100, including offset mitigation logic 106 of FIG. 1 discussed above, may include or be associated with components, such as a charger, a charging control module (CCM), a power management circuit (PMC), a power management integrated circuit (PMIC), a common mode (CM) adjuster, a physical layer (PHY), and a system on chip (SoC), as discussed in more detail below in regard to FIG. 4. At block 214, an indication and charging current request is sent to a charger. The charger can then generate control signals to broadcast the information via a charging control module (CCM). For example, the CCM may have a register containing charging information. Some of the charging information may be stored in the CCM register from a $V_{BUS}$ sensor. In some examples, the CCM may be communicatively coupled to the charger through an interconnect such as I2C to a power management integrated circuit (PMIC) containing the CCM as discussed in detail with regard to FIG. 4 below. The control signals indicating the charging current information can be sent via the I2C interconnect to a PMC on a SoC.

At block 216, a PMC on an SoC reads broadcast communication from the CCM by polling the CCM register and receives charging current information. In some examples, the PMC can be operating in a host mode or a device mode. For example, in a host mode, the PMC may contain the charging current information and communicate the charging current information to the SoC. In a device mode, the PMC may have a current sensor sensing a $V_{BUS}$ line and measuring the charging current. In some examples, a device mode PMC can communicate back to a device receiver. In the case of a dual role device, the PMIC can communicate charging current information from a known current. For example, charging current information may be detected by the PMIC during a device mode by sensing the $V_{BUS}$ line. The PMIC can then send the charging information to the PMC of the SoC via an I2C interconnect. The PMC of the SoC can also boot the physical layer (PHY).

At block 218, the physical layer (PHY) sends a request for charging current information to the PMC. The PMC can forward the request to the PMIC and receive charging current from the PMIC via an interconnect such as I2C. The PMC can then return the charging current information to the PHY. In some examples, a current sensor may be used at the PMIC if the PMIC is operating in a device mode. For example, a PMIC in device mode can use the current sensor to determine the charge voltage and send the charge voltage information to the CCM register as described in greater detail with respect to FIG. 4 below. In some examples, the PMIC as a host can communicate current information to charge and write to the CCM register as described with regards to FIG. 4 in greater detail below.

At block 220, if the charging current information contains an indication of a ground offset, then the charging current information is sent to the ground offset control state machine. In some examples, the common mode adjustment circuitry can then mitigate the ground offset according to techniques described in detail with reference to FIG. 3 below. In some examples, after the ground offset is mitigated, then the physical layer can request a charging current control status indication as described in block 218 above. If the charging current information does not contain any indication of a ground offset, then the PHY can repeat block 218 as indicated by arrow 222.

This process flow diagram is not intended to indicate that the blocks of the method 200 are to be executed in any particular order, or that all of the blocks are to be included in every case. Further, any number of additional blocks not shown may be included within the method 200, depending on the details of the specific implementation.

Figure 3:
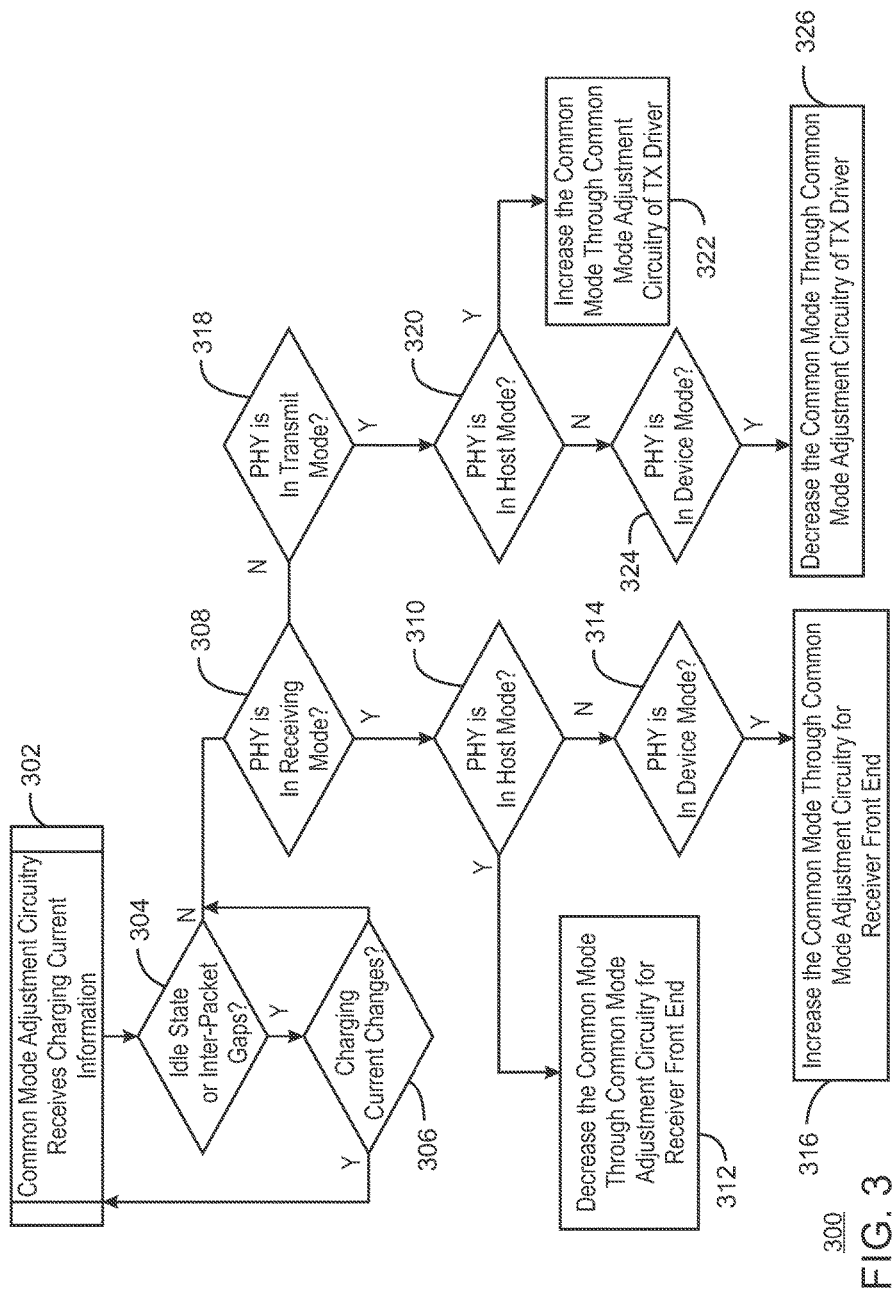
FIG. 3 is a high level flow diagram of an example method for adjusting common mode voltage to mitigate a voltage offset.

FIG. 3 is a high level flow diagram of an example method for adjusting common mode voltage to mitigate a voltage offset. The method of FIG. 3 is generally referred to by the reference number 300 and can be implemented using the offset mitigation logic 106 of FIG. 1.

In FIG. 3, at block 302, a common mode adjustment circuitry receives charging current information. In some examples, the common mode adjustment circuitry can be a state machine that can control for ground offset by adjusting a common mode voltage. The common mode adjustment circuitry may thus compensate for an induced common mode. For example, a voltage may be induced via charging at higher current or via a longer cable or a higher resistance cable.

At block 304, an information update is received by the common mode adjustment circuitry during either inter-packet gaps, during an idle state, or during boot. For example, inter-packet gaps can include time in between transmissions of data.

At block 306, in some examples, if the charging current changed, then the common mode adjustment circuitry may receive the information update with the updated charging current. If the charging current did not change, then the method may proceed to block 308.

At block 308, if the physical layer (PHY) of a transceiver is in receiver mode, then the method can proceed to block 310. In some examples, if the PHY is in receiver mode, then a charge sensor can be used to detect a charging current.

At block 310, if the PHY of a transceiver is in host mode then the method can proceed to block 312. At block 312, if the PHY is in a receiving host mode, the receiver input common mode can be decreased through the common mode adjustment circuitry. In some examples, the common mode adjustment circuitry may be a circuit on the front end of the transceiver.

At block 314, if the PHY is in a device mode, then the method can proceed to block 316. At block 316, if the PHY is in a receiving device mode, then the receiver input common mode voltage can be increased through the common mode adjustment circuitry. For example, the common mode adjust may be a circuit on the front end of the transceiver.

At block 318, if the PHY is operating in a transmitter mode, then the method can proceed to block 320. At block 320, if the PHY is operating in a host mode, then the method can continued to block 322. At block 322, if the PHY is operating in a transmitting host mode, then the common mode adjustment circuitry of the transceiver can increase the common mode via the common mode adjustment circuitry by adjusting the transmit driver swing. For example, the common mode adjustment circuitry can increase the common mode voltage at the transmission driver.

At block 324, if the PHY is operating in a device mode, then the method can proceed to block 326. At block 326, if the PHY is operating in a transmitting device mode, then the common mode adjustment circuitry of the transceiver can decrease the common mode voltage of the transmitted output to mitigate ground offset. For example, the common mode adjustment circuitry can be coupled to the transmission driver and cause the driver to transmit data at a lower common mode voltage. In some examples, the common mode adjustment circuitry can also adjust a common mode voltage amount needed to mitigate the offset also depending on whether a data transmission or a chirp sequence is being transmitted. A chirp sequence, as used herein, is a kind of transmission signaling that is part of a USB protocol and can be used to signal events. For example, a device and host may signal to each other through chirp sequences in order to operate in a high-speed mode.

This process flow diagram is not intended to indicate that the blocks of the method 300 are to be executed in any particular order, or that all of the blocks are to be included in every case. Further, any number of additional blocks not shown may be included within the method 300, depending on the details of the specific implementation.

Figure 4:
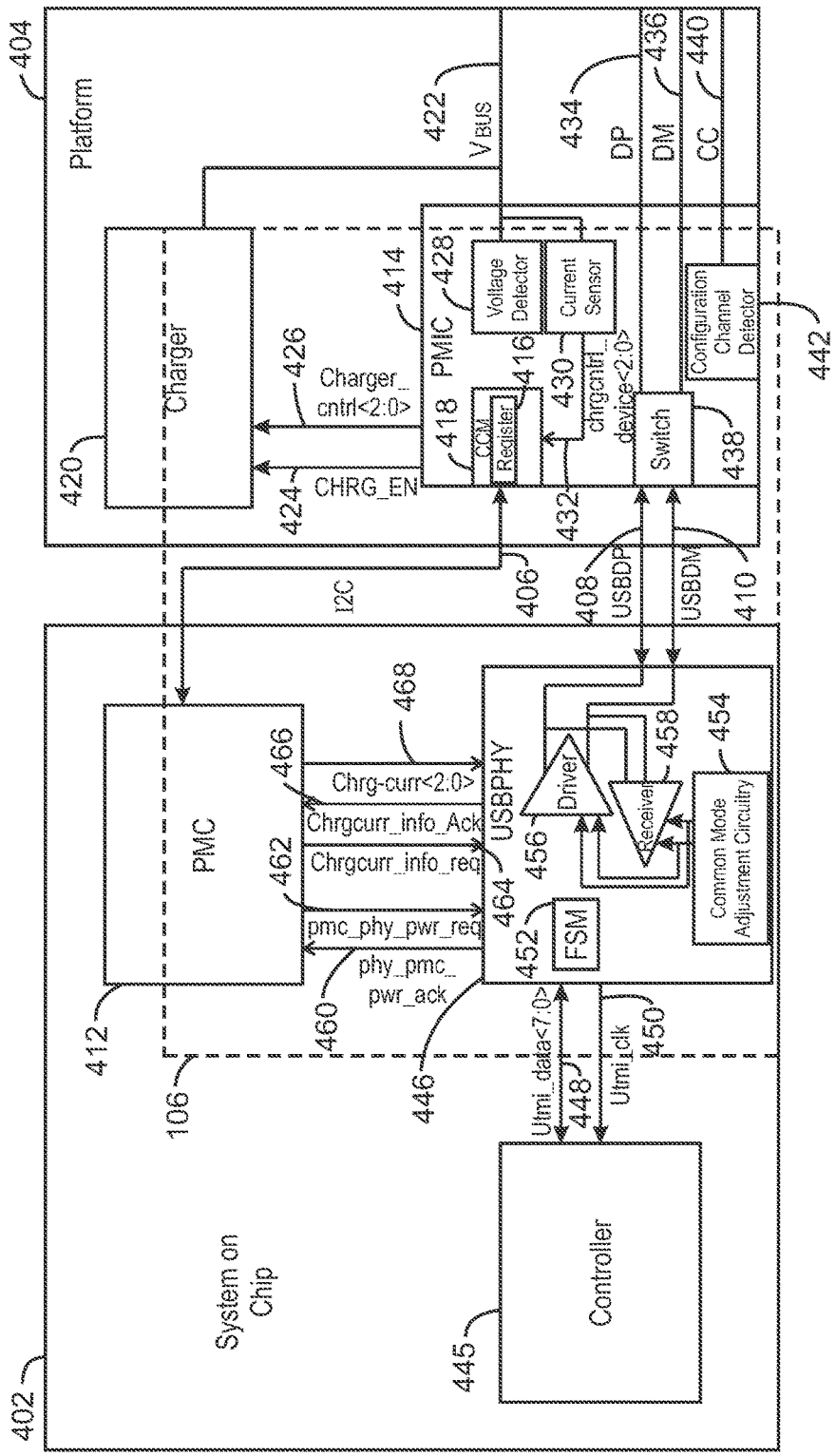
FIG. 4 illustrates an example apparatus that can mitigate voltage offsets by adjusting a common mode voltage.

FIG. 4 illustrates an example apparatus that can mitigate voltage offsets by adjusting a common mode voltage. The example apparatus of FIG. 4 is generally referred to by the reference number 400 and can be implemented as a transceiver 104 of FIG. 1 above and can be used to implement any of methods 200-300 above.

The apparatus 400 of FIG. 4 includes a system on chip (SoC) 402 and a platform 404 that are connected by an interconnect 406, and two data lines 408, 410. The interconnect 406 couples a power management circuit (PMC) 412 of the SoC 402 to a power management integrated circuit (PMIC) 414 of the platform 404. In particular, the interconnect 406 connects the PMC 412 to a register 416 of a charging control module (CCM) 418 inside the PMIC 414. The platform 404 also includes a charger 420 that is connected to a power line $V_{BUS}$ 422 and communicatively coupled to the PMIC 414 to receive a charge enable signal CHRG_EN 424 and a control signal Chrg_cntrl<2:0> 426 from the PMIC 414. The power line $V_{BUS}$ 422 is also connected to a voltage detector 428 and a current sensor 430 of the PMIC 414. The current sensor 430 is communicatively coupled to the CCM 418 via communication line 432. The platform 404 also includes a differential pair of data lines DP 434 and DM 436 that are connected to a switch 438 of the PMIC 414 that can be used to isolate the SoC 402 during charging detecting device signaling as defined in the USB battery charging specification. The platform 404 further includes a charging current line 440 connected to a configuration channel detector 442. The SoC 402 also includes a controller 445 communicatively coupled to a physical layer 446 via a universal transceiver macro interface (UTMI) data line 448 and a UTMI clock signal line 450. The UTMI interface is a low speed interface between physical layer 446 and the controller 445 that is used for communication. The physical layer 446 includes a finite-state machine (FSM) 452 and a common mode adjustment circuitry 454 coupled to both a driver 456 and a receiver 458. The FSM 452 can include a list of states, and a triggering condition for each transition between the states. In some cases, the common mode adjustment circuitry 454 may be a component of the offset mitigation logic 106 discussed above in regard to FIG. 1. The physical layer 446 is communicatively coupled with the PMC 412 via handshake lines 460 and 462, a charging current information request line 464, a charging current information acknowledgment line 466, and a charging current information line 468. A dotted lined box 106 represents the portion of apparatus 400 corresponding to the offset mitigation logic 106 of transceiver 104 of FIG. 1 above.

In the apparatus 400 of FIG. 4, charging current information stored in the register 416 of the CCM 418 is sent via the interconnect 406 to the SoC 402 for use in adjusting a common mode voltage. At the PMIC 414, a current sensor can sense $V_{BUS}$ line 422 and indicate the current flowing through $V_{BUS}$ line 422. When operating in a host mode, the physical layer 446 may know in advance how much charging current will be provided to a device and the CCM 418 can broadcast this charging current information to the SOC 402 through the interconnect 406. For example, the interconnect 406 can be I2C. Similarly, if system is operating in a device mode, then the current sensor 430 can send indication of amount of charging current to CCM 418. In some examples, the charging current amount can be stored in the register 416 of the CCM 418. The CCM 418 can broadcast a charging current message Chrg_curr<2:0> via the interconnect 406 to the SOC 402. For example, the CCM 418 can broadcast a charging current message Chrg_curr<2:0> in the form of binary messages based on detected charging current as shown in Table 1 below.

TABLE 1

| Charging Current | Chrg_curr<2:0> | Corresponding Compensation |
|---|---|---|
| 500 mA | 000 | No action Rx able to tolerate 125 mV ground offset |
| 900 mA | 001 | Compensate offset for additional 100 mV increase in ground offset |
| 1.5 A | 010 | Compensate offset for additional 250 mV increase in ground offset |
| 2 A | 011 | Compensate offset for additional 375 mV increase in ground offset |
| 2.5 A | 100 | Compensate offset for additional 500 mV increase in ground offset |
| 3 A | 101 | Compensate offset for additional 625 mV increase in ground offset |

Still referring to FIG. 4, the physical layer 446 can receive the charging current indication from the PMC 414 via the interconnect 406 and send the indication to a common mode (CM) adjuster 454. In some examples, the common mode adjustment circuitry 454 is a circuit that can adjust common mode voltage generated due to induced ground offset. For example, the ground offset may be either higher side or lower side depending on whether the apparatus 400 is operating in a host or a device mode. In particular, for a receiving device mode, the induced common mode voltage can be calculated using Equation 1:

$$Vcm\_induced\_device=Vgnd\_offset*rd/(rd+rh) \quad \text{Eq. 1}$$

In Eq. 1, rd is a resistance of a device termination and rh is a resistance of a host termination. Similarly, for a receiving host mode, the induced common mode voltage can be calculated using Equation 2:

$$Vcm\_induced\_host=Vgnd\_offset*rh/(rd+rh) \quad \text{Eq. 2}$$

In Eq. 2, rd is device termination resistance and rh is host termination resistance. In other words, the induced common mode voltage can be used to mitigate voltage offset.

In some examples, the common mode adjustment circuitry can adjust common mode voltage of transmitter output and receiver input according to the topology used based on following scenarios as described with reference to Table 2.

TABLE 2

| Use case | Ground Offset with Current mode topology (When Vgnd_offset = 375 mV) | Ground offset with Voltage mode topology (When Vgnd_offset = 375 mV)) |
| --- | --- | --- |
| Host during high speed mode transmitting | 431.25 mV | 431.25 mV |
| Device during High speed traffic | −31.25 mV | −31.25 mV |
| Host during Device chirp-k receiving | 460 mV | 835 mV |
| Device during unterminated host Chirp | −135 mV | −135 mV |
| Device receiving terminated Host Chirp | −31.25 mV | −31.25 mV |

Table 2 shows a list of use cases and corresponding ground offsets assuming a 375 mV ground offset for both a current mode topology and a voltage mode topology. When the apparatus 400 is in a host mode and receiving a data packet, the apparatus 400 will see an increase in common mode voltage by Vgnd_offset*rh/(rd+rh). Similarly, when the apparatus 400 is in a device mode and receiving a packet, the apparatus will experience a decrease in common mode voltage by Vgnd_offset*rd/(rd+rh). The common mode adjustment circuitry can accordingly compensate the decrease in common mode voltage. As shown in Table 2, a high-speed (HS) host receiver during a device chirp will see a VCm+Vgnd_offset. For example, when receiving a device chirp in a voltage mode topology, the ground offset may be 835 mV, which is outside the USB specified allowed range of −50 mV to 500 mV. The CM adjuster can thus compensate the increase in common mode voltage by adjusting transceiver to mitigate increase in common mode based on the ground offset and use case as define in the flow chart of FIG. 3. Similarly, an HS device during an unterminated host Chirp can experience a common mode decrease by an offset of Vcm-Vgnd_offset. The common mode adjustment circuitry can compensate the decrease in common mode by adjusting the transceiver as define in the flow chart of FIG. 3 above.

Table 3 below gives a more generic case where a common mode voltage may change based on Vhighmin, Vhighmax, Vlowmax, Vlowmin, VCm_induced_host, VCm_induced_device, Vchirpkmax and Vchirpkmin parameters, where Vhighmax is the maximum high swing during high speed transmission mode, Vhighmin is the minimum swing during high speed operation, Vlowmin is the minimum low voltage of the differential line during high speed mode, Vlowmax is the maximum low voltage of differential line during high speed mode, Vchirpkmax is the maximum Chirp K voltage, and Vchirpkmin is the minimum Chirp K voltage.

TABLE 3

| Use case | Ground Offset with Current mode topology | Ground offset with Voltage mode topology |
| --- | --- | --- |
| Host during high speed mode transmitting | (0.5*(Vhighmax + Vlowmax) + VCm_induced_host | (0.5*(Vhighmax + Vlowmax) + VCm_induced_host |
| Device during High speed traffic | (0.5*(Vhighmin + Vlowmin) − VCm_induced_device | (0.5*(Vhighmin + Vlowmin) − VCm_induced_device |
| Host during Device chirp-k receiving | 0.5*Vchirpkmax + Vlowmax | 0.5*Vchirpkmax + Vlowmax + VCm_induced_host |
| Device during unterminated host Chirp | 0.5*Vchirpkmin − Vlowmin − Vgnd_offset | 0.5*Vchirpkmin − Vlowmin − VCm_induced_device |
| Device receiving terminated Host Chirp | (0.5*(Vhighmin + Vlowmin) − VCm_induced_host | (0.5*(Vhighmin + Vlowmin) − VCm_induced_device |

Still referring to table 3, table 3 describes the more generic cases and values of common mode voltage changes during various conditions. For example, the common mode adjustment circuitry 454 can adjust a transceiver depending on induced common mode as define in the above generic use cases.

Again referring to FIG. 4, in some examples, the PMIC 414 can also have charging current detection capability. For example, a configuration channel (CC) detector 442 can detect a configuration channel (CC) line 440 to determine an indication of a charging current requested by a coupled device. Alternatively, or in addition, the CC detection can be implemented through a dedicated chip (not shown). The dedicated chip can also interact with the PMIC 414 and the SOC 402 through the interconnect 406. In some examples, the current sensor 430 inside the PMIC 414 can monitor the $V_{BUS}$ line while charging a local battery and broadcast a charging current message to the SOC 402 through the CCM 418 and via the interconnect 406. For example, the interconnect 406 may use I2C communication.

In some examples, the handshaking lines 460 and 462 can be used for communication between the PMC 412 and the PHY 446 to update charging current information. For example, a power request can be sent via line 462 from the PMC 412 to the PHY 446. The PMC 412 can return a power acknowledgement via line 460. In some examples, the PMC 412 can request charging current information from the PHY 446 via line 464. The PHY 446 may respond with a charging current acknowledgment packet via line 466. The PMC 412 can also provide the PHY 446 with charging current information via line 468. For example, the charging current information may have been received via the interconnect 406 from the register 416 of the CCM 418.

Figure 5:
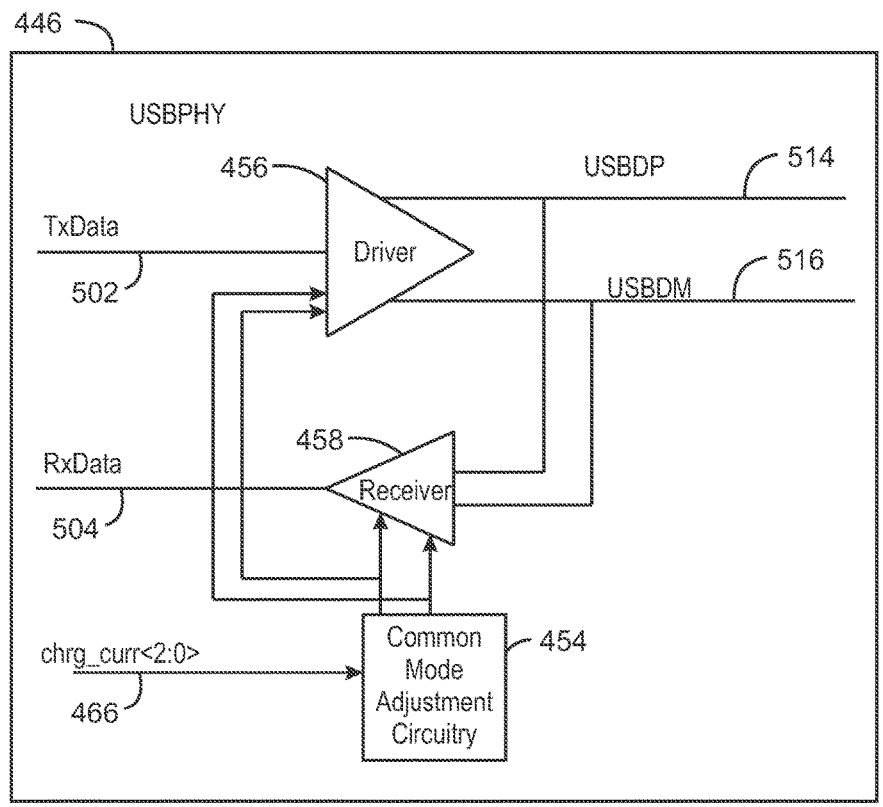
FIG. 5 is a diagram illustrating an example physical layer of a computer bus with a common mode adjustment circuitry according to embodiments described herein.

FIG. 5 is a diagram illustrating an example physical layer of a computer bus with a common mode adjustment circuitry according to embodiments described herein. The example physical layer of FIG. 5 is referred to generally by the reference number 500 and can be implemented in the example apparatus 400 above.

In FIG. 5, the common mode adjustment circuitry 454 can adjust the common mode voltage at the output of driver 456 or receiver 458. A physical layer level logic can poll a charging current register (not shown) periodically and receive charging current information. After receiving an update of charging current information, the common mode adjustment circuitry can determine the operation of BUS condition. For example, the common mode adjustment circuitry can determine whether the BUS is operating in a transmitting mode, receiving mode, or chirp mode, etc., and whether the BUS is configured in a host mode or a device mode. The common mode adjustment circuitry can then calculate a common mode voltage adjustment based on the conditions defined in Tables 2 and 3 and adjust a transceiver parameter either during inter-packet gaps, during a cold boot, or during an idle state.

Figure 6:
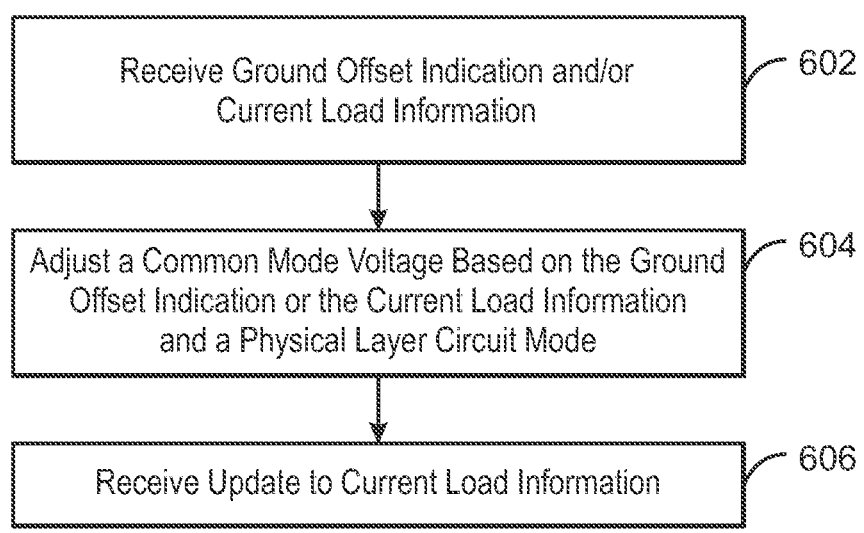
FIG. 6 is a flow diagram illustrating an example method for adjusting a common mode voltage according to embodiments described herein.

FIG. 6 is a flow diagram illustrating an example method for adjusting a common mode voltage according to embodiments described herein. The example method of FIG. 6 is referred to generally by the reference number 600 and can be implemented via the offset mitigation logic 106 of FIGS. 1 and 4.

At block 602, the offset mitigation logic receives ground offset indication and/or current load information. In some examples, the ground offset indication and/or current load information can be in the form of binary code. For example, the binary code can correspond to a particular offset and/or current load. In some examples, the offset mitigation logic can poll a charging control module (CCM) register to receive the current load information. In some examples, the current load information comprises a charging current indication and a charging current amount. For example, the current indication can be based on configuration channel (CC) detection and detection of current capability through vRd detection as discussed in greater detail with respect to block 208 of FIG. 2 above.

At block 604, the offset mitigation logic adjusts a common mode voltage based on the ground offset indication or the current load information and a physical layer circuit mode. For example, the physical layer circuit mode can be a host mode or a device mode as described in FIG. 1 above. Further, the physical layer circuit mode can include a receiving or transmitting mode. For example, adjusting the common mode voltage can include decreasing the common mode voltage via the common mode adjustment circuitry if the physical layer circuit mode is in a receiving host mode. Similarly, adjusting the common mode voltage further can include increasing the common mode voltage via the common mode adjustment circuitry if the physical layer circuit mode is in a receiving device mode. In some examples, adjusting the common mode voltage can further include decreasing the common mode voltage via the common mode adjustment circuitry if the physical layer circuit mode is in a transmitting host mode. Likewise, adjusting the common mode voltage further can include decreasing the common mode voltage via the common mode adjustment circuitry if the physical layer circuit mode is in a transmitting device mode. In some examples, the amount of adjustment can also be based on a use case such as sending or receiving data packets and/or chirp sequences.

At block 606, the offset mitigation logic receives an update to the current load information. In some examples, the offset mitigation logic may receive an update to the current load information during an inter-packet gap. For example, an inter-packet gap may be a period of time between transmissions of data. In some examples, the offset mitigation logic may receive an update to the current load information during an idle state or a cold boot. For example, the update may occur after a G3 or S5 suspension state.

In some examples, an operating system can display the offset voltage indication to a user. For example, the operating system can display the offset voltage indication via a graphical user interface. In some example, the offset voltage indication can also be sent to a tuner module. The tuner module can then tune a transceiver through the common mode adjustment circuitry.

This process flow diagram is not intended to indicate that the blocks of the method 600 are to be executed in any particular order, or that all of the blocks are to be included in every case. Further, any number of additional blocks not shown may be included within the method 600, depending on the details of the specific implementation.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

Example 1 is an apparatus for adjusting voltage. The apparatus includes a a current sensor to detect charging current information. The apparatus also includes a a common mode adjustment circuitry to adjust a common mode voltage of a transceiver based on the charging current information and whether the transceiver is configured in a device mode or a host mode.

Example 2 incorporates the subject matter of Example 1. In this example, the current sensor includes a sensor of power management logic of the transceiver and the apparatus is an all-in-one connector.

Example 3 incorporates the subject matter of any combination of Examples 1-2. In this example, the transceiver is a first transceiver, and the common mode adjustment circuitry is configured to mitigate an increase in a ground offset between the first transceiver and a second transceiver communicatively coupled to the first transceiver over a computer bus.

Example 4 incorporates the subject matter of any combination of Examples 1-3. In this example, the common mode adjustment circuitry is further configured to adjust the common mode voltage during data transmission.

Example 5 incorporates the subject matter of any combination of Examples 1-4. In this example, the charging current information includes a charging current indication and a charging current amount.

Example 6 incorporates the subject matter of any combination of Examples 1-5. In this example, the apparatus also includes a polling logic to poll a charging current register associated with the current sensor at predetermined intervals and update the charging current information at a power management circuit during an inter-packet gap, an idle state, a cold boot; or any combination thereof.

Example 7 incorporates the subject matter of any combination of Examples 1-6. In this example, the common mode adjustment circuitry is configured to decrease the common mode voltage if a physical layer circuit mode is in a receiving host mode and increase the common mode voltage if the physical layer circuit mode is in a transmitting host mode.

Example 8 incorporates the subject matter of any combination of Examples 1-7. In this example, the common mode adjustment circuitry is configured to increase the common mode voltage if a physical layer circuit mode is in a receiving device mode and decrease the common mode voltage if the physical layer circuit mode is in a transmitting device mode.

Example 9 incorporates the subject matter of any combination of Examples 1-8. In this example, the offset voltage indication is to be displayed to a user through an operating system.

Example 10 incorporates the subject matter of any combination of Examples 1-9. In this example, the offset voltage indication to be sent to a tuner module and the tuner module is to tune a transceiver through the common mode adjustment circuitry.

Example 11 is a method for mitigating voltage offset. The method includes receiving, via a sensor, charging current information. The method also includes adjusting, via a common mode adjustment circuitry, a common mode voltage based on the charging current information and a physical layer circuit mode.

Example 12 incorporates the subject matter of Example 11. In this example, the charging current information comprises current load information, further comprising polling a charging control module (CCM) register to receive the current load information.

Example 13 incorporates the subject matter of any combination of Examples 11-12. In this example, the method includes receiving an update to the current load information during an inter-packet gap.

Example 14 incorporates the subject matter of any combination of Examples 11-13. In this example, the method includes receiving an update to the current load information during an idle state.

Example 15 incorporates the subject matter of any combination of Examples 11-14. In this example, the method includes receiving an update to the current load information during a cold boot.

Example 16 incorporates the subject matter of any combination of Examples 11-15. In this example, the charging current information comprises a charging current indication and a charging current amount, the current indication based on detection of a voltage on a configuration channel.

Example 17 incorporates the subject matter of any combination of Examples 11-16. In this example, adjusting the common mode voltage further includes decreasing the common mode voltage via the common mode adjustment circuitry if a physical layer circuit mode is in a receiving host mode and increasing the common mode voltage via the common mode adjustment circuitry if the physical layer circuit mode is in a transmitting host mode.

Example 18 incorporates the subject matter of any combination of Examples 11-17. In this example, adjusting the common mode voltage further includes increasing the common mode voltage via the common mode adjustment circuitry if a physical layer circuit mode is in a receiving device mode and decreasing the common mode voltage via the common mode adjustment circuitry if the physical layer circuit mode is in a transmitting device mode.

Example 19 incorporates the subject matter of any combination of Examples 11-18. In this example, the method also includes displaying the offset voltage indication to a user through an operating system.

Example 20 incorporates the subject matter of any combination of Examples 11-19. In this example, the method includes sending the offset voltage indication to a tuner module, the tuner module to tune a transceiver through the common mode adjustment circuitry.

Example 21 is a system for adjusting a common mode voltage. The system includes a current sensor to detect charging current information. The system also includes a host physical layer circuit including a common mode adjustment circuitry to adjust a common mode voltage of a transceiver based on the charging current information.

Example 22 incorporates the subject matter of Example 21. In this example, the system also includes a second current sensor to detect current load information. The system further includes a device physical layer circuit including a second common mode adjustment circuitry to adjust a common mode voltage of a second transceiver based on the charging current information received from the second current sensor.

Example 23 incorporates the subject matter of any combination of Examples 21-22. In this example, the first and second common mode adjustment circuitry are configured to decrease the common mode voltage if a mode of the host physical layer circuit comprises a receiving mode and a mode of the device physical layer circuit mode comprises a transmitting mode.

Example 24 incorporates the subject matter of any combination of Examples 21-23. In this example, the first and second common mode adjustment circuitry are configured to increase the common mode voltage if the mode of the device physical layer circuit mode comprises a receiving mode and a mode of the host physical layer circuit comprises a transmitting mode.

Example 25 incorporates the subject matter of any combination of Examples 21-24. In this example, the system further includes a polling logic to poll a charging current register at predetermined intervals and update the charging current information during an inter-packet gap, an idle state, a cold boot, or any combination thereof.

Example 26 incorporates the subject matter of any combination of Examples 21-25. In this example, the current sensor includes a sensor of power management logic of the transceiver and the system further includes an all-in-one connector.

Example 27 incorporates the subject matter of any combination of Examples 21-26. In this example, the common mode adjustment circuitry is further configured to adjust the common mode voltage during data transmission Example 28 incorporates the subject matter of any combination of Examples 21-27. In this example, the charging current information includes a charging current indication and a charging current amount.

Example 29 incorporates the subject matter of any combination of Examples 21-28. In this example, the system further includes an operating system configured to display an offset voltage indication to a user.

Example 30 incorporates the subject matter of any combination of Examples 21-29. In this example, the system further includes a tuner module configured to receive an offset voltage indication and tune a transceiver through the common mode adjustment circuitry.

Example 31 is an apparatus for adjusting voltage. The apparatus includes a means for detecting charging current information. The apparatus also includes a means for adjusting a common mode voltage of a transceiver based on the charging current information and whether the transceiver is configured in a device mode or a host mode.

Example 32 incorporates the subject matter of Example 31. In this example, the means for detecting charging current information includes a sensor of power management logic of the transceiver and the apparatus is an all-in-one connector.

Example 33 incorporates the subject matter of any combination of Examples 31-32. In this example, the transceiver is a first transceiver, and the common mode adjustment mitigates an increase in a ground offset between the first transceiver and a second transceiver communicatively coupled to the first transceiver over a computer bus.

Example 34 incorporates the subject matter of any combination of Examples 31-33. In this example, the means for adjusting a common mode voltage is further configured to adjust the common mode voltage during data transmission.

Example 35 incorporates the subject matter of any combination of Examples 31-34. In this example, the charging current information includes a charging current indication and a charging current amount.

Example 36 incorporates the subject matter of any combination of Examples 31-35. In this example, the apparatus further includes means to poll a charging current register associated with the current sensor at predetermined intervals and update the charging current information at a power management circuit during an inter-packet gap, an idle state, a cold boot; or any combination thereof.

Example 37 incorporates the subject matter of any combination of Examples 31-36. In this example, the means for adjusting the common mode is configured to decrease the common mode voltage if a physical layer circuit mode is in a receiving host mode and increase the common mode voltage if the physical layer circuit mode is in a transmitting host mode.

Example 38 incorporates the subject matter of any combination of Examples 31-37. In this example, the means for adjusting the common mode is configured to increase the common mode voltage if a physical layer circuit mode is in a receiving device mode and decrease the common mode voltage if the physical layer circuit mode is in a transmitting device mode.

Example 39 incorporates the subject matter of any combination of Examples 31-38. In this example, the apparatus further includes means for displaying the offset voltage indication to a user.

Example 40 incorporates the subject matter of any combination of Examples 31-39. In this example, the apparatus further includes means for tuning a transceiver, the offset voltage indication to be sent to the means for tuning the transceiver.

Example 41 is a system for adjusting a common mode voltage. The system includes a means for detecting charging current information. The system also includes a host physical layer circuit including a means for adjusting a common mode voltage of a transceiver based on the charging current information.

Example 42 incorporates the subject matter of Example 41. In this example, the system also includes a second means for detecting current load information. The system further includes a device physical layer circuit including a second means for adjusting a common mode voltage of a second transceiver based on the charging current information received from the second current sensor.

Example 43 incorporates the subject matter of any combination of Examples 41-42. In this example, the first and the second common mode adjustment circuitrys are further configured to decrease the common mode voltage if a mode of the host physical layer circuit comprises a receiving mode and a mode of the device physical layer circuit mode comprises a transmitting mode.

Example 44 incorporates the subject matter of any combination of Examples 41-43. In this example, the first and the second common mode adjustment circuitrys are further configured to increase the common mode voltage if the mode of the device physical layer circuit mode comprises a receiving mode and a mode of the host physical layer circuit comprises a transmitting mode.

Example 45 incorporates the subject matter of any combination of Examples 41-44. In this example, the system further includes means for polling a charging current register at predetermined intervals and updating the charging current information during an inter-packet gap, an idle state, a cold boot, or any combination thereof.

Example 46 incorporates the subject matter of any combination of Examples 41-45. In this example, the system further includes an all-in-one connector and the means for detecting charging current information includes a sensor of power management logic of the transceiver.

Example 47 incorporates the subject matter of any combination of Examples 41-46. In this example, the means for adjusting the common mode is further configured to adjust the common mode voltage during data transmission.

Example 48 incorporates the subject matter of any combination of Examples 41-47. In this example, the charging current information includes a charging current indication and a charging current amount.

Example 49 incorporates the subject matter of any combination of Examples 41-48. In this example, the system further including means for displaying the offset voltage indication to a user.

Example 50 incorporates the subject matter of any combination of Examples 41-49. In this example, the system further including means for tuning a transceiver, the offset voltage indication to be sent to the means for tuning the transceiver.

It is to be understood that specifics in the aforementioned examples may be used anywhere in one or more embodiments. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for adjusting voltage, comprising:
a current sensor to detect charging current information in a device mode; and
a common mode adjustment circuitry to adjust a common mode voltage of a transceiver based on the charging current information and whether the transceiver is configured in the device mode or a host mode, wherein in response to the device mode the charging current information is obtained from the current sensor, and in response to the host mode the charging current information is obtained from a physical layer via a broadcast from a charging control module.

2. The apparatus of claim 1, wherein the current sensor comprises a sensor of power management logic of the transceiver and the apparatus comprises an all-in-one connector.

3. The apparatus of claim 1, wherein the transceiver is a first transceiver, and wherein the common mode adjustment circuitry is configured to mitigate an increase in a ground offset between the first transceiver and a second transceiver communicatively coupled to the first transceiver over a computer bus.

4. The apparatus of claim 1, wherein the common mode adjustment circuitry is further configured to adjust the common mode voltage during data transmission.

5. The apparatus of claim 1, wherein the charging current information comprises a charging current indication and a charging current amount.

6. The apparatus of claim 1, further comprising a polling logic to poll a charging current register associated with the current sensor at predetermined intervals and update the charging current information at a power management circuit during an inter-packet gap, an idle state, a cold boot; or any combination thereof.

7. The apparatus of claim 1, wherein the common mode adjustment circuitry is configured to decrease the common mode voltage if a physical layer circuit mode is in a receiving host mode and increase the common mode voltage if the physical layer circuit mode is in a transmitting host mode.

8. The apparatus of claim 1, wherein the common mode adjustment circuitry is configured to increase the common mode voltage if a physical layer circuit mode is in a receiving device mode and decrease the common mode voltage if the physical layer circuit mode is in a transmitting device mode.

9. The apparatus of claim 1, wherein an offset voltage indication is to be displayed to a user through an operating system.

10. The apparatus of claim 9, wherein the offset voltage indication is to be sent to a tuner module and the tuner module is to tune the transceiver through the common mode adjustment circuitry.

11. A method for mitigating voltage offset, comprising:
receiving charging current information; and
adjusting, via a common mode adjustment circuitry, a common mode voltage based on the charging current information and a physical layer circuit mode, wherein in response to the physical layer circuit mode being a device mode, the charging current information is received from a sensor, and in response to the physical layer circuit mode being a host mode, the charging current information is received from a physical layer via a broadcast from a charging control module.

12. The method of claim 11, wherein the charging current information comprises current load information, further comprising polling a charging control module (CCM) register to receive the current load information.

13. The method of claim 12, further comprising receiving an update to the current load information during an inter-packet gap.

14. The method of claim 12, further comprising receiving an update to the current load information during an idle state.

15. The method of claim 12, further comprising receiving an update to the current load information during a cold boot.

16. The method of claim 11, wherein the charging current information comprises a charging current indication and a charging current amount, the current indication based on detection of a voltage on a configuration channel.

17. The method of claim 11, wherein adjusting the common mode voltage further comprises decreasing the common mode voltage via the common mode adjustment circuitry if the physical layer circuit mode is in a receiving host mode and increasing the common mode voltage via the common mode adjustment circuitry if the physical layer circuit mode is in a transmitting host mode.

18. The method of claim 11, wherein adjusting the common mode voltage further comprises increasing the common mode voltage via the common mode adjustment circuitry if the physical layer circuit mode is in a receiving device mode and decreasing the common mode voltage via the common mode adjustment circuitry if the physical layer circuit mode is in a transmitting device mode.

19. The method of claim 11, further comprising displaying the offset voltage indication to a user through an operating system.

20. The method of claim 11, further comprising sending the offset voltage indication to a tuner module, the tuner module to tune a transceiver through the common mode adjustment circuitry.

21. A system for adjusting a common mode voltage, comprising:
a current sensor to detect charging current information; and
a common mode adjustment circuitry to adjust a common mode voltage of a transceiver based on the charging current information and whether the transceiver is configured in a device mode or a host mode, wherein in response to the device mode the charging current information is obtained from the current sensor, and in response to the host mode the charging current information is obtained from a physical layer via a broadcast from a charging control module.

22. The system of claim 21, further comprising:
a second current sensor to detect current load information; and
a device physical layer circuit comprising a second common mode adjustment circuitry to adjust a common mode voltage of a second transceiver based on the charging current information received from the second current sensor.

23. The system of claim 22, wherein the first and second common mode adjustment circuitry are configured to decrease the common mode voltage if a mode of the host physical layer circuit comprises a receiving mode and a mode of the device physical layer circuit mode comprises a transmitting mode.

24. The system of claim 22, wherein the first and second common mode adjustment circuitry are configured to increase the common mode voltage if the mode of the device physical layer circuit mode comprises a receiving mode and a mode of the host physical layer circuit comprises a transmitting mode.

25. The system of claim 21, further comprising a polling logic to poll a charging current register at predetermined intervals and update the charging current information during an inter-packet gap, an idle state, a cold boot, or any combination thereof.

* * * * *